United States Patent [19]

Müller et al.

[11] Patent Number: 4,868,268

[45] Date of Patent: * Sep. 19, 1989

[54] PROCESS FOR PREPARING POLYURETHANES FROM AN ORGANIC DIISOCYANATE ESTER

[75] Inventors: Hanns P. Müller, Odenthal; Roland Gipp, Cologne, both of Fed. Rep. of Germany

[73] Assignee: Bayer Aktiengesellschaft, Leverkusen, Fed. Rep. of Germany

[*] Notice: The portion of the term of this patent subsequent to Aug. 9, 2005 has been disclaimed.

[21] Appl. No.: 266,557

[22] Filed: Nov. 3, 1988

Related U.S. Application Data

[63] Continuation of Ser. No. 66,903, Jun. 25, 1987, abandoned.

[30] Foreign Application Priority Data

Jul. 5, 1986 [DE] Fed. Rep. of Germany ....... 3622609

[51] Int. Cl.⁴ ............................................. C08G 18/38
[52] U.S. Cl. ....................... 528/76; 528/49; 528/59; 528/61; 528/62; 528/65; 528/66; 528/68; 528/80; 528/85
[58] Field of Search ...................... 528/66, 76, 80, 85, 528/68, 49, 59, 61, 62, 65

[56] References Cited

U.S. PATENT DOCUMENTS

| | | | |
|---|---|---|---|
| 3,014,894 | 12/1961 | Muller et al. | 260/75 |
| 3,095,399 | 6/1963 | Muller et al. | 260/33.6 |
| 3,180,883 | 4/1965 | Case | 260/453 |
| 3,644,289 | 2/1972 | Sayigh et al. | 260/47 |
| 4,086,211 | 4/1978 | Nakauchi et al. | 528/76 |
| 4,174,434 | 11/1979 | Dieterich et al. | 528/71 |
| 4,201,852 | 5/1980 | Dieterich | 528/73 |
| 4,762,901 | 8/1988 | Dhein et al. | 528/73 |

FOREIGN PATENT DOCUMENTS 934458 8/1963 United Kingdom.

OTHER PUBLICATIONS

Chemical Abstracts, 90:23918c, Barbalata et al., The Influence of the Structure of Aromatic Diisocyanates on the Preparation and the Properties of Polyurethanes. Chemical Abstracts, Jan. 22, 1979, vol. 90, No. 4, "The Influence of the Structure of Aromatic Diisocyanates on the Preparation ... etc."
R. T. Morrison et al., Organic Chemistry, Third Edition, 1962, pp. 262-265 and 394-396.
K. Mislow, Introduction to Stereochemistry, 1966, pp. 81-86.
W. J. Jackson, Brit. Polym. Journ. 12, 1980, p. 154.
Ch. Wiegand, Z Naturforsch, 6B, p. 240, 1951.
K. Praefcke, D. Schmid, G. Heppke, Chem. Ztg. 104, p. 269, 1980.
R. Steinstraesser, L. Pohl. Agnew Chem. 85, 1973, p. 706.

*Primary Examiner*—John Kight
*Assistant Examiner*—Dennis R. Daley
*Attorney, Agent, or Firm*—Gene Harsh; Joseph C. Gil; Richard E. L. Henderson

[57] ABSTRACT

Novel polyurethanes are prepared by reacting
(a) an organic diisocyanate of formula

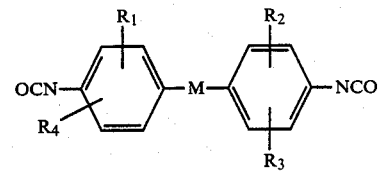

wherein
M represents —CH=CH—; —N=N—; —CH=N—;

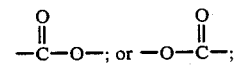

and where $R_1$ through $R_4$ may be the same or different and represent hydrogen, halogen, CN, $CF_3$ or saturated aliphatic $C_1$-$C_{12}$ alkyl residues which may be interrupted by ether hydrogen atoms with
(b) compounds of molecular weights of from between 400 and 10,000 and which contain at least two active hydrogen atoms reactive toward isocyanate groups.

8 Claims, No Drawings

PROCESS FOR PREPARING POLYURETHANES FROM AN ORGANIC DIISOCYANATE ESTER

This application is a continuation of application Ser. No. 066,903 filed June 25, 1987, now abandoned.

Liquid-crystal (LC) polymers have been discussed by many authors. W. J. Jackson (in Brit. Polym. Jour. 12, 1980, p. 154) described the properties of LC polymers of aromatic polyesters of the following structure:

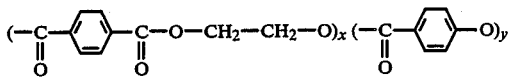

The most recent work concerning LC polymers was disclosed at the 16th Freiburg Symposium on Liquid Crystals, March, 1986, which took place at the Frauenhofer Institute fuer Angewandte Festkoerperphysik, Eckertstr, 4, 7800 Freiburg. To date, polyurethane plastics made from liquid-crystal prepolymers have not been known.

In the conventional Wiegand preparation of liquid-crystals, stable liquid-crystalline compounds contain aromatic rings with mesomeric diatomic center parts (Ch. Wiegand, Z. Naturforsch. 6b, 240 1951).

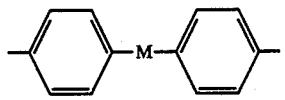

wherein M represents, for example,

—CH=CH—; —N=N—; —CH=N— and

Alicyclic ring systems also may result in thermally stable liquid-crystals (K. Praefcke, D. Schmid, G. Heppke, Chem. Ztg. 104, 269, 1980).

At least three characteristic phases are observed in the liquid-crystal compounds under a polarization microscope, namely the smectic phase, the nematic phase and the cholesteric phase (R. Steinstrasser, L. Pohl, Angew. Chem. 85, 1973, 706).

Upon determination of various applications of nematic liquid-crystal compounds, an intense search was undertaken for suitable nematic substances with the lowest possible melting points and the highest possible clearing temperatures, with advantageous anisotropic properties and adequate resistance against chemical and physical factors.

Aromatic-ester type diisocyanates are known (see German Patent 1,085,869).

It was found that the diisocyanates described in German Patent 1,085,869 evince a markedly nematic phase. Quantitative differential thermal analysis (DTA) measurement of the compound (I)

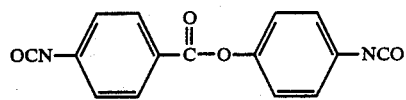

showed that upon heating and melting, there was a transition at 117.2° C. from solid to nematic and at 172.6° C. there was a transition from nematic to isotropic liquid. When cooling the melt, the isotropical liquid to nematic transition takes place at 172° C. and the transition from nematic to solid takes place at 102° C.

Quantitative measurements under a polarizationmicroscope also show these phase transitions.

Heating:
transition from solid to nematic at 117.5° C.; transition from nematic to isotropic liquid at 172.1° C.;
Cooling:
transition from isotropic liquid to nematic at 172.5° C.; transition from nematic to solid at 101.1° C.

However, substances with the highest possible degree of order (two-phase) are especially significant industrially. The object of the present invention is to produce substances showing a two-phase temperature range as wide as possible. This object was attained by preparing the polyurethanes described in further detail below and by the process of making them.

DESCRIPTION OF THE INVENTION

NCO-prepolymers and semi-prepolymers prepared from at least one diisocyanate of formula (II) below represent ordered two-phase compounds that do not undergo phase changes in the temperature range of from at least 3 to 300° C. This finding is surprising and was unexpected. The semi-polymers will contain the free diisocyanate of formula (II). It was expected that the free diisocyanate (II) would melt upon heating, and this would have been observed by a phase change in quantitative differential thermal analysis (DTA). Surprisingly, this was not the case.

The object of the invention is a process for preparing polyurethanes by reacting (a) an organic diisocyanate of the formula

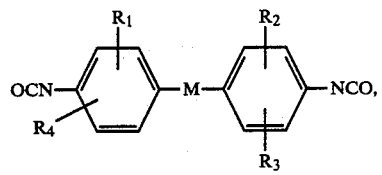

wherein
M represents —CH=CH—; —N=N—; —CH=N—;

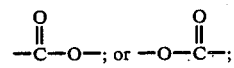

and $R_1$ through $R_4$ can be the same or different and represent hydrogen, halogen, CN, $CF_3$ or saturated aliphatic $C_1$-$C_{12}$ alkyl residues which may be interrupted by ether oxygen atoms, with (b) compounds of molecular weights between 400 and 10,000 containing at least two hydrogen atoms reactive with isocyanate groups.

The following components may also be present (c) compounds of molecular weights between 18 and 399 containing at least two hydrogen atoms reactive with isocyanate groups, (d) compounds with molecular weights between 32 and 500 containing one hydrogen atom reactive with isocyanates, and (e) other accessories and additives known in the chemistry of polyurethanes. It is preferred that $R_1$ through $R_4$ represent methyl or hydrogen.

In the preferred embodiment, the diisocyanate component (a) is first reacted with at least a portion of component (b) and optionally with at least a portion of component (c) into an NCO prepolymer. The prepolymer is then reacted with components (b) and/or (c), and/or (d) possibly in the presence of the accessories and additives (e) into the polyurethane.

In a preferred embodiment, the diisocyanate component (a), which may have been dissolved in a solvent, is reacted in a first stage with component (b) in the temperature range of 20° to 220° C. at a molar ratio of 1.2:1 to 4:1 to form the prepolymer.

It is further preferred that the diisocyanate component (a) be reacted with component (b) and optionally with component (c) in plasticizers which are preferably polyester-based PVC plasticizers such as dibutylphthalate or dioctylphthalate.

In the general formula (II), $R_1$ through $R_4$ are especially preferred to be hydrogen.

The invention furthermore relates to the polyurethanes made by the process of this invention.

The ordered polyisocyanate prepolymers show no phase change in the temperature range of from 3° and 300° C. and are (inhomogeneous) "white" viscous liquids or "white" solutions.

The most preferred diisocyanate is 4-isocyanato-benzoic-acid-4-isocyanatophenylester.

Mixtures of the known diisocyanates and the diisocyanates of the general formula (II) may also be used. If such mixtures are used, the diisocyanates of the general formula (II) must be present in an amount of at least 10% by weight, and preferably at least 50% by weight. Accordingly, mixtures of the diisocyanates according to the formula (II) and conventional aliphatic, cycloaliphatic, araliphatic and aromatic or heterocyclic polyisocyanates or their derivatives are useful. Such conventional isocyanates are described (e.g., by W. Siefken in Justus Liebig's Annalen der Chemie, 562, pp 75–136, and in German Auslegeschrift 2,832,253). Especially preferred are the commercially available polyisocyanates such as, for instance 2,4-and/or 2,6-toluylenediisocyanate, and mixtures of these isomers (TDI); diphenylmethanediisocyanate-4,4'- and/or 2,4'- and/or 2,2'-isomers; polyphenyl-polymethylenepolyisocyanates such as are prepared by aniline-formaldehyde condensation and ensuing phosgenation ("crude" MDI); and "modified polyisocyanates" containing groups such as carbodiimide groups, urethane groups, allophanate groups, isocyanurate groups, urea groups and/or biuret groups, and, in particular such modified polyisocyanates which are derived from 2,4- and/or 2,6-toluylenediisocyanate or from 4,4'- and/or 2,4'-diphenylmethanediisocyanate. Naphthalene-1,5-diisocyanate also is suitable. Furthermore, aliphatic diisocyanates are also suitable. Such aliphatic isocyanates include hexamethylene-diisocyanate, dicyclohexylmethane-4,4'-diisocyanate, cyclohexane-1,4-diisocyanate, or biuretized polyisocyanates, derived from the above diisocyanates or from isophoronediisocyanate, and trimers of the said diisocyanates.

Trifunctional isocyanates may also be mixed with the diisocyanate (II). However, care must be taken to form statistically bifunctional isocyanates by a first partial reaction of the triisocyanates with aliphatic or aromatic monoalcohols or monoamines.

Compounds of molecular weights between 400 and 10,000 and with at least two hydrogens reactive with isocyanates are suitable initial components (component b)). These include compounds containing amino-, thio- land/or carboxyl-groups and preferably those containing hydroxyl groups. Especially preferred are compounds containing 2 to 4 hydroxyl groups, and specifically those having molecular weights between 800 and 6000. Preferred compounds are polyester amides and polycarbonates, polyacetals, polythioethers, polyethers and polyesters containing from 2 to 2.2 hydroxyl groups, such as are known for the manufacture of homogeneous or cellular polyurethanes and are described, e.g., in German Auslegeschrift No. 2,832,253, pp 11–18. Especially preferred are polyesters prepared by adding one or more alkylene oxides (ethylene oxides and, in particular, propylene oxide) to divalent or polyvalent "starters" (for instance, propylene glycol, glycerine, triethanolamine and trimethylolpropane). Also useful are polyethers containing polyaddition products of diisocyanates from hydrazine and/or diamines and/or glycols or polymers and/or graft polymers, preferably from styrene and acrylonitrile, in dispersed or dissolved form. Also suitable are polyesters, including polycarbonates, such as are ordinarily used as soft segments. The preferred compounds of higher molecular weights of this type have as a rule melting points less than 60° C. and preferably less than 45° C. Higher molecular weight compounds with a functionality of 2 and containing hydroxyl groups are preferred.

Where desired, the initial components may include compounds with at least two hydrogen atoms reactive to isocyanates and having molecular weights between 18 and 399 (component(c)). In this case, too, the compounds containing hydroxyl groups and/or amino groups and/or thio groups and/or carboxyl groups and/or hydrazide groups are preferred. As a rule these compounds include 2 to 8, preferably 2 to 4 hydrogens reactive with isocyanates. Examples can be found in German Auslegeschrift No. 2,832,253 (pp 19–20) and include water; ethylene glycol; butanediol-1,4; 2,2-dimethylpropanediol; trimethylolpropane; formitol mixtures; hydrazine; ethylene diamine; 3,3'-dimethyl-diaminodicyclohexylmethane; 3,5-diethyl-2,4- (and/or 2,6)-diaminotoluene; or adipic acid dihydrazide or mixtures thereof.

In principle all monofunctional and relatively low-molecular (molecular weight 32 to 500) compounds with one hydrogen atom reactive with NCO can be used as chain terminators (component d)). For example, monoalcohols such as methanol, n-octanol, isopropanol, isooctyl alcohol or stearyl alcohol; primary or secondary monoamines such as ethylamine, di-n-butylamine, diisopropylamine, stearylamine, 4-amino-2,2,6,6-tetramethyl-piperidine, acetohydrazide, stearylhydrazide and aniline; or thiol compounds such as octylmercaptan can be used. Monofunctional alcohols, amines or thiols are preferred.

The initial components (a), (b), (c) and (d) are reacted into polyurethanes, preferably linear polyurethanes, for (thermoplastic) elastomers and coatings. In the prepolymerization procedure, the NCO prepolymers frequently are reacted in approximately equivalent quantities of the component (b), (c) and/or (d) as illustratively cited above.

Accessories and additives known in polyurethane chemistry (for instance water, catalysts, surfactants, reaction retarders, plasticizers or fungistatic or bacteriostatic substances, stabilizers and light stabilizers, further such fillers as barium sulfate, silica gel, lampblack, whiting, glass fibers, carbon fibers, aramide fibers and dichroitic dyes) may also be used.

The components are reacted in a known manner, often by using machinery. Details concerning processing equipment which may be used in the invention, are found in Kunststoff-Handbuch, Vol. VIII, published by Vieweg and Hochtlen, Carl Hanser Verlag, Munich 1966. As a rule, the reaction temperatures are in the range of from 80° to 200° C., preferably from 90° to 140° C. The hardening times (reaction times to form the polymer networks) depend on the selection of the initial components, any catalysts used and the machine mixers, and are generally between 1 minute and 24 hours.

The invention is further illustrated but is not intended to be limited by the following examples in which all parts and percentages are by weight unless otherwise specified.

EXAMPLES

EXAMPLE 1

400 grams of a propylene glycol-started propyleneoxide polyether with an OH number of 56, and having an average molecular weight of 2000 and an average functionality of 2, are mixed with 153 gram of dibutylphthalate and dehydrated for 2 hours at 130° C. and 18 mbars. The mixture is allowed to cool to room temperature and 214 grams of the 4-isocyanato-benzoicacid-4-isocyanatophenylester in fine powder form prepared according to German Patent No. 1,085,869 are added. The mixture is then heated to 130° C. and 18 mbars for 3 grams with stirring. A white viscous liquid is obtained with the following characteristics:

% NCO 5.4 (NCO prepolymer (I))
viscosity 1.355 mPas/60° C.

Polarization microscope data: (Mettler FP 5 apparatus, X60, crossed polarizing filters): Small ordered areas are noted showing high mobility in the present matrix at low temperatures. Above about 120° C., the viscosity rises rapidly and the ordered occlusions become immobile. No phase changes can be observed under the microscope up to 300° C.

185 grams of the above-described prepolymer (I) are mixed at 110° C. with 24.1 grams of 4-chloro-3,5-diamino-benzoic-acid isobutylester, degassed, and placed into a preheated mold at 110° C. The mixture was tempered for 24 hours at 110° C. An opaque elastomer with excellent properties was obtained.

EXAMPLE 2

350 grams of the polyether diol described in Example 1 were dehydrated for 2 hours at 120° C. and 18 mbar with stirring. The substance was left to cool to 110° C. and 98 grams of 4-isocyanato-phenylester were added. The mixture was heated to a temperature of 180° C., while stirring and at 18 mbars. The batch was then stirred at that temperature for 2 hours. Following cooling an NCO prepolymer (2) with the following characteristics was obtained:

% NCO : 2,57
viscosity: 18074 mPas/60° C.
appearance: white dispersion.

Polarization microscope data: shows no change in this matrix up to 300° C. Moreover, phase changes would be evident as endothermal signals in DTA measurements. To check into the sample's cooling behavior, low-temperature measurements were carried out down to $-50°$ C. When cooling down to this temperature, no solidification was observed. Therefore the sample was crystallized in liquid nitrogen and measurements were taken starting at $-50°$ C. when heating again. Fusion took place at about $+3°$ C. Thus, the sample can be cooled over a wide temperature range. *DTA measurements* (Mettler TA 2000 apparatus): quantitative test cells, aluminum crucibles.

150 grams of the above-described NCO prepolymer (2) were mixed with 4.3 grams of butanediol-(1,4), degassed and placed into a preheated mold (90° C.). Tempering is carried out for 6 hours at 90° C. and then 12 hours at 120° C. An opaque elastomer with excellent mechanical properties was obtained.

EXAMPLE 3

56 grams (0.2 moles) of 4-isocyanato-benzoicacid-4-isocyanatophenylester were dissolved in 250 ml of dry chlorobenzene with stirring and in $N_2$ with boiling. 200 grams (0.1 mole) of a linear polypropyleneglycol (MW 2000) were dripped in at 130° C. with stirring for 3 hours at the same conditions. While stirring, the solvent is removed at a bath temperature of 100° C. and at 13-3 Torr. In this manner a white, highly viscous prepolymer containing 2.57% NCO is obtained.

150 grams of the prepolymer so made were heated to 100° C. and degassed by vacuum, then mixed with 4.2 gram of butanediol-1,4, and poured into an $18 \times 18 \times 0.4$ cm mold preheated to 100° C. The plate was tempered for 6 hours at 90° C. and then for 12 hours at 120° C.

An opaque 2-phase elastomer with excellent bounce properties was obtained.

An elastomer made under the same conditions but using 1,5-naphthylenediisocyanate instead of 4-isocyanato-benzoic-acid-4-isocyanatophenylester is transparent and accordingly single-phase.

EXAMPLE 4

550 grams (0.275 moles) of a linear polyester of adipic acid and ethylene glycol (MW 2000) were dehydrated for 2 hours with agitation at 120° C. and 15 mbars. 154 grams (0.55 moles) of 4-isocyanato-benzoicacid-4-isocyanatophenylester were added in powder form at 110° C. and the entire mixture was stirred for 2 hours at 110° C. The NCO content of the mixture has dropped to 1.72%. The prepolymer was poured into a mold. Due to atmospheric humidity, a white molded body, free from bubbles was obtained within 10 days, which showed excellent elastomer properties. The polarization microscope revealed a highly ordered state in the form of regular, colored domains of the polyurethane-polyurea produced.

193 grams of the above-described prepolymer having an NCO content of 1.724% (0.075 moles of NCO) were mixed immediately upon preparation with 3.4 grams of butanediol-1,4 (0.075 moles of OH) at 120° C. and poured into a preheated mold. A white, highly elastic polyurethane elastomer is obtained after 24 hours at 120° C.

EXAMPLE 5

To 200 grams (0.1 mole) of a linear polyester previously dehydrated in water-jet vacuum at 80 to 100° C. and consisting of adipic acid and ethyleneglycol (OH number=56, molecular weight=2000) were added 50.4 grams (0.18 moles) of 4-isocyanato-benzoic-acid-4'-isocyanatophenylester (MW=280, NCO=29.5%, calculated=30.0%) in molten form (about 130° C.). The reagents are agitated at about 100° C. until the NCO content was about 3% (15 to 25 minutes). This was followed by brief degassing and addition of 6 grams (0.067 moles) of butanediol-(1,4). After a reaction time about 2 to 3 minutes, the liquid mixture was poured into a mold treated with a release agent, which is then heated to 120° C. Thereupon the solidified molded body was post-dried for another 4 to 6 hours at 120° C. A highly elastic polyurethane elastomer with the following properties was obtained:

Casting time (pot life) is about 3 minutes at 100° C.
Modulus (100%) (mPa): 5.12
Tensile strength (mPa): 36.5
Elongation at rupture (%): 700
Tear strength (KN/m) : 57.8
Elasticity (%) : 48
Hardness (Shore A) : 87

This elastomer shows very high thermal dimensional stability. As determined by Thermomechanical Analysis (TMA) softening of the sample takes place only in a temperature range of 180°–200° C.

EXAMPLE 6

50.4 grams of diisocyanate of Example 5 was replaced by 53.8 grams of 4-isocyanato-benzoic-acid-3-methyl-4-isocyanatophenylester (molecular weight 294, m.p. 72°–74° C., NCO =28.3%, calculated 28.6%) and the procedure stated in Example 5 resulted in a molded body with the following mechanical properties:

Casting time (pot life) at 100° C. is about 20 (minutes)
Modulus (100%) (mPa) : 3.5
Tensile strength (mPa) : 32.7
Elongation at rupture (%): 750
Tear strength (KN/m) : 38.5
Elasticity (%) : 32
Hardness (Shore A): 75

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing polyurethanes by reacting
   (a) an organic diisocyanate of the formula

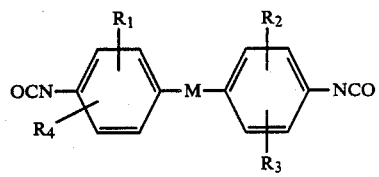

wherein
   M represents

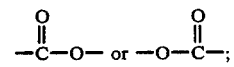

and where $R_1$ through $R_4$ are the same or different and represent hydrogen, halogen, CN, $CF_3$, saturated aliphatic $C_1$-$C_{12}$ alkyl residues, or $C_1$-$C_{12}$ alkyl residues interrupted by ether oxygen atoms, with
   (b) compounds having molecular weights of from between 400 and 10,000 and containing at least two active hydrogen atoms reactive toward isocyanate groups.
2. The process of claim 1, wherein $R_1$ through $R_4$ represent hydrogen or methyl.
3. The process of claim 1, further comprising
   (c) compounds having molecular weights between 18 and 399 and containing at least two hydrogen atoms reactive with isocyanate groups, and
   (d) compounds having molecular weights of from 32 to 500 and containing one hydrogen atom reactive toward isocyanate groups.
4. The process of claim 3, characterized in that in the first stage the diisocyanate component (a) is reacted with at least a portion of component (b) or with at least a portion each of components (b) and (c) into an NCO-prepolymer which is thereafter reacted with any remaining portion of components (b) or (c) or component (d).
5. The process of claim 4, characterized in that the diisocyanate component (a) is dissolved in solvent and is reacted into the prepolymer in a first stage with the component (b) at a temperature of from 20 to 220° C. in a molar ratio of from 1.2:1 or 4:1.
6. The process of claim 5, characterized in that the diisocyanate component (a) is reacted with the component (b) in a polyester-based PVC plasticizer.
7. The process of claim 4, characterized in that component (d) is in the form of low-molecular, monofunctional alcohols, amines or thiols.
8. A polyurethane made by the process of claim 1.